United States Patent
Lee et al.

(10) Patent No.: US 8,467,467 B2
(45) Date of Patent: Jun. 18, 2013

(54) APPARATUS AND METHOD FOR PARTIAL ADAPTIVE TRANSMISSION IN MULTIPLE-INPUT MULTIPLE-OUTPUT SYSTEM

(75) Inventors: Yong-Hwan Lee, Seoul (KR); JaeYun Ko, Uiwang-si (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 1211 days.

(21) Appl. No.: 12/109,611

(22) Filed: Apr. 25, 2008

(65) Prior Publication Data

US 2009/0203335 A1 Aug. 13, 2009

(30) Foreign Application Priority Data

Apr. 26, 2007 (KR) .............................. 2007-0041018

(51) Int. Cl.
*H04B 7/02* (2006.01)

(52) U.S. Cl.
USPC ........... 375/267; 375/260; 375/259; 375/295; 375/316; 375/219

(58) Field of Classification Search
USPC .................. 375/267, 260, 259, 295, 316, 219
See application file for complete search history.

(56) References Cited

U.S. PATENT DOCUMENTS

| | | | |
|---|---|---|---|
| 7,272,294 B2* | 9/2007 | Zhou et al. | 385/147 |
| 7,362,822 B2* | 4/2008 | Li et al. | 375/299 |
| 7,564,914 B2* | 7/2009 | Hansen et al. | 375/267 |
| 7,711,066 B2* | 5/2010 | Jiang et al. | 375/296 |
| 7,991,090 B2* | 8/2011 | Kim et al. | 375/347 |
| 2004/0042556 A1* | 3/2004 | Medvedev et al. | 375/260 |
| 2005/0032521 A1* | 2/2005 | Lee et al. | 455/450 |
| 2005/0185574 A1* | 8/2005 | Codreanu et al. | 370/208 |
| 2005/0237971 A1* | 10/2005 | Skraparlis | 370/329 |
| 2005/0287962 A1* | 12/2005 | Mehta et al. | 455/101 |
| 2007/0041464 A1 | 2/2007 | Kim et al. | |
| 2007/0098106 A1* | 5/2007 | Khojastepour et al. | 375/267 |
| 2007/0184853 A1* | 8/2007 | Hottinen et al. | 455/456.1 |
| 2008/0049596 A1* | 2/2008 | Khojastepour et al. | 370/203 |
| 2008/0069281 A1* | 3/2008 | Olesen et al. | 375/367 |
| 2008/0192683 A1* | 8/2008 | Han et al. | 370/329 |

FOREIGN PATENT DOCUMENTS

| | | | |
|---|---|---|---|
| KR | 10-2006-0028989 A | | 4/2006 |
| KR | 10-2006-0068082 A | | 6/2006 |
| KR | 10-2006-0096360 A | | 9/2006 |

* cited by examiner

*Primary Examiner* — Kenneth Lam
(74) *Attorney, Agent, or Firm* — Jefferson IP Law, LLP

(57) ABSTRACT

An apparatus and method for partial adaptive transmission in a Multiple-Input Multiple-Output (MIMO) system are provided. The method includes estimating a correlation matrix between Transmit (Tx) antennas and an average Signal to Noise Ratio (SNR) and generating a long-term precoding matrix composed of a predetermined number of dominant eigen dimensions of the correlation matrix by using the estimated correlation matrix and average SNR. The apparatus and method provide a new adaptive MIMO transmission method capable of reducing the feedback information overhead and maximizing performance.

11 Claims, 5 Drawing Sheets

APPARATUS AND METHOD FOR PARTIAL ADAPTIVE TRANSMISSION IN MULTIPLE-INPUT MULTIPLE-OUTPUT SYSTEM

PRIORITY

This application claims the benefit under 35 U.S.C. §119(a) to a Korean patent application filed in the Korean Intellectual Property Office on Apr. 26, 2007 and assigned Serial No. 2007-41018, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd. and 2) Seoul National University Industry Foundation.

BACKGROUND OF THE INVENTION

1. Field of the Invention

The present invention relates generally to an apparatus and method for partial adaptive transmission in a Multiple-Input Multiple-Output (MIMO) system. More particularly, the present invention relates to an apparatus and method for partial adaptive transmission for transmitting data by using a dominant eigen dimension of a correlation matrix in a MIMO system having a spatial correlation between channels.

2. Description of the Related Art

Channel information is important in a Multiple-Input Multiple-Output (MIMO) system to achieve a high system capacity. When a transmitting end knows the MIMO channel information, high system capacity can be achieved by using a Singular Value Decomposition (SVD) scheme and a water filling scheme. In a time-varying channel environment, the MIMO channel information varies over time, and thus the information needs to be fed back periodically from a receiving end to the transmitting end. However, this feed back of information leads to an increase in overhead. To reduce the feedback information overhead, a quantization method may be used. However, the quantization method suffers in that quantization noise increases in proportion to a dimension of a MIMO channel, thereby decreasing performance.

A full adaptive transmission method will now be described as an example of a conventional adaptive MIMO transmission method. In the following description, a system model includes a transmitting end which has $n_t$ antennas and a receiving end which has $n_r$ antennas. In this case, a Receive (Rx) signal can be expressed by Equation (1) below.

$$y = Hx + n \quad (1)$$

In Equation (1), H denotes an $(n_r \times n_t)$-dimensional channel matrix in which an average of each element is 0 and a dispersion of each element is 1, x denotes an $(n_t \times 1)$-dimensional Transmit (Tx) signal vector having a power constraint of P, and n denotes an $(n_r \times 1)$-dimensional Additive White Gaussian Noise (AWGN) vector in which a dispersion of each element is 1.

A correlation matrix is defined by Equation (2) below.

$$R_t := \frac{E\{H^*H\}}{n_r} \quad (2)$$

In Equation (2), * denotes a conjugate transpose operation. The correlation matrix can be SVD-decomposed as expressed by Equation (3) below.

$$R_t = Q\Sigma^2 Q^* \quad (3)$$

In Equation (3), Q denotes an $(n_t \times n_t)$-dimensional unitary matrix, where $Q=[q_1 \ldots q_{n_t}]$, and $\Sigma$ denotes an $(n_t \times n_t)$-dimensional diagonal matrix having diagonal elements of $\sigma_1 \geq \ldots \geq \sigma_{n_t}$, where $\Sigma^2$ diag$\{\sigma_1^2, \ldots, \sigma_{n_t}^2\}$. Herein, the channel matrix can be expressed by Equation (4) below by using the correlation matrix.

$$H = \tilde{H} R_t^{1/2} \quad (4)$$

In Equation (4), $\tilde{H}$ denotes an $(n_r \times n_t)$-dimensional matrix and satisfies Equation (5) below.

$$E[\tilde{h}_i^* \tilde{h}_j] = \begin{cases} 0, & i \neq j \\ n_r, & i = j \end{cases} \quad (5)$$

In Equation (5), $\tilde{h}_i$ denotes an $i^{th}$ column of $\tilde{H}$.

The capacity of a MIMO system using the full adaptive transmission method can be expressed by Equation (6) below.

$$C = \log_2 det(I + H K_x H^*) \quad (6)$$

In Equation (6), the capacity can be maximized by optimizing a Tx covariance matrix $K_x$, where $K_x := E\{xx^*\}$. The optimal covariance matrix is related to an instantaneous channel matrix which is decomposed as expressed by Equation (7) below.

$$H = U \Lambda V^* \quad (7)$$

In Equation (7), U and V respectively denote an $(n_r \times n_r)$-dimensional unitary matrix and an $(n_t \times n_t)$-dimensional unitary matrix, where $U=[u_1 \ldots u_{n_r}]$ and $V=[v_1 \ldots v_{n_t}]$, and $\Lambda$ denotes an $(n_r \times n_t)$-dimensional diagonal matrix in which diagonal elements $\lambda_1 \geq \ldots \geq \lambda_{n_{min}}$ are greater than 0 and the remaining elements are 0, where $n_{min} = \min(n_t, n_r)$. In this case, an optimal $K_x$ can be expressed by Equation (8) below.

$$K_x = V P V^* \quad (8)$$

In Equation (8), $P = \text{diag}\{P_1, \ldots, P_{n_t}\}$ denotes an optimal Tx power which maximizes the capacity, and is an $(n_t \times n_t)$-dimensional diagonal matrix in which first $n_{min}$ diagonal elements are obtained by using the water filling scheme with respect to $\{\lambda_i, i=1, \ldots, n_{min}\}$, and the remaining diagonal elements are 0. Therefore, the transmitting end requires Tx power allocation information $\{P_i, i=1, \ldots, n_{min}\}$ and an $(n_t \times n_{min})$-dimensional precoding matrix $V_{min} = [v_1 \ldots v_{n_{min}}]$ corresponding to the Tx power allocation information. Herein, the system capacity of Equation (6) can be expressed by Equation (9) below.

$$C_{full} = \sum_{i=1}^{n_{min}} \log_2(1 + \lambda_i^2 P_i) \quad (9)$$

In Equation (9), $\lambda_i$ denotes an $i^{th}$ singular value of the channel matrix H, and $P_i$ denotes Tx power allocated to an $i^{th}$ spatial channel.

However, the Tx power allocation information and the precoding matrix, used by the transmitting end to maximize capacity, must be provided as feed back by a receiving end, thus increasing the amount of necessary feedback information and overhead. Accordingly, there is a need for a new adaptive MIMO transmission method capable of reducing the feedback information overhead and maximizing performance.

SUMMARY OF THE INVENTION

An aspect of the present invention is to address at least the above-mentioned problems and/or disadvantages and to provide at least the advantages described below. Accordingly, an aspect of the present invention is to provide an apparatus and method for partial adaptive transmission in a Multiple Input Multiple Output (MIMO) system.

Another aspect of the present invention is to provide an apparatus and method for partial adaptive transmission for transmitting data by using a dominant eigen dimension (i.e., a virtual antenna) of a correlation matrix in a MIMO system having a spatial correlation between channels.

In accordance with an aspect of the present invention, a feedback transmission method of a receiving end in a MIMO system is provided. The method includes estimating a correlation matrix between Transmit (Tx) antennas and an average Signal to Noise Ratio (SNR) and generating a long-term precoding matrix composed of a preset number of dominant eigen dimensions of the correlation matrix using the estimated correlation matrix and average SNR.

In accordance with another aspect of the present invention, a feedback transmission method of a receiving end in a MIMO system is provided. The method includes generating a channel response matrix by estimating a channel, performing a Singular Value Decomposition (SVD) operation on the estimated channel and generating a short-term precoding matrix by extracting a preset number of column vectors from a unitary vector obtained by performing the SVD operation.

In accordance with yet another aspect of the present invention, a data transmission method of a transmitting end in a MIMO system is provided. The method includes allocating power to all data streams using power allocation information, performing short-term precoding by multiplying the power-allocated data streams by a short-term precoding matrix, performing long-term precoding by multiplying the short-term precoded data streams by a long-term precoding matrix and transmitting the long-term precoded data streams.

In accordance with still another aspect of the present invention, a feedback transmission apparatus of a receiving end in a MIMO system is provided. The apparatus includes a channel estimator for estimating a channel and for forming a channel matrix using information on the estimated channel and a feedback information generator for estimating a correlation matrix between Tx antennas and an average Signal to average Noise Ratio (SNR) by using the channel matrix and for generating a long-term precoding matrix composed of a preset number of dominant eigen dimensions of the correlation matrix using the estimated correlation matrix and average SNR.

In accordance with another aspect of the present invention, a feedback transmission apparatus of a receiving end in a MIMO system is provided. The apparatus includes a channel estimator for estimating a channel and for generating a channel response matrix using information on the estimated channel and a feedback information generator for obtaining a unitary matrix and a diagonal matrix by performing an SVD operation on the estimated channel, for generating a short-term precoding matrix by extracting a preset number of column vectors from the obtained unitary vector, and for generating power allocation information using a water filling scheme with respect to diagonal elements of the obtained diagonal matrix.

In accordance with another aspect of the present invention, a data transmission apparatus of a transmitting end in a MIMO system is provided. The apparatus includes a power allocator for allocating power to all data streams by using power allocation information, a short-term precoder for performing short-term precoding by multiplying the power-allocated data streams by a short-term precoding matrix and a long-term precoder for performing long-term precoding by multiplying the short-term precoded data streams by a long-term precoding matrix and for transmitting the long-term precoded data streams.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, an exemplary apparatus and method for partial adaptive transmission will be described in which a transmitting end transmits a signal by using a preset number of dominant eigen dimensions (i.e., virtual antennas), instead of using all spatial channels in a Multiple-Input Multiple-Output (MIMO) system having a spatial correlation between the channels.

In practice, a spatial correlation between channels exists in a MIMO environment. In this case, most channel energy is concentrated on specific eigen dimensions of a correlation matrix. If it is assumed that the correlation matrix has $n_t$ eigen dimensions, then the first eigen dimension contains a high power gain, and the power gain decreases. It can also be assumed herein that the correlation matrix dose not frequently change over time. Accordingly, exemplary embodiments of the present invention propose an apparatus and method for partial adaptive transmission in which data is transmitted by considering only dominant eigen dimensions of the correlation matrix. As such, since data is transmitted by selecting only a few Transmit (Tx) antenna having high power gain, most energy transmittable through a MIMO channel can be transmitted to a receiving end, and an amount of feedback information can be reduced.

Figure 1:
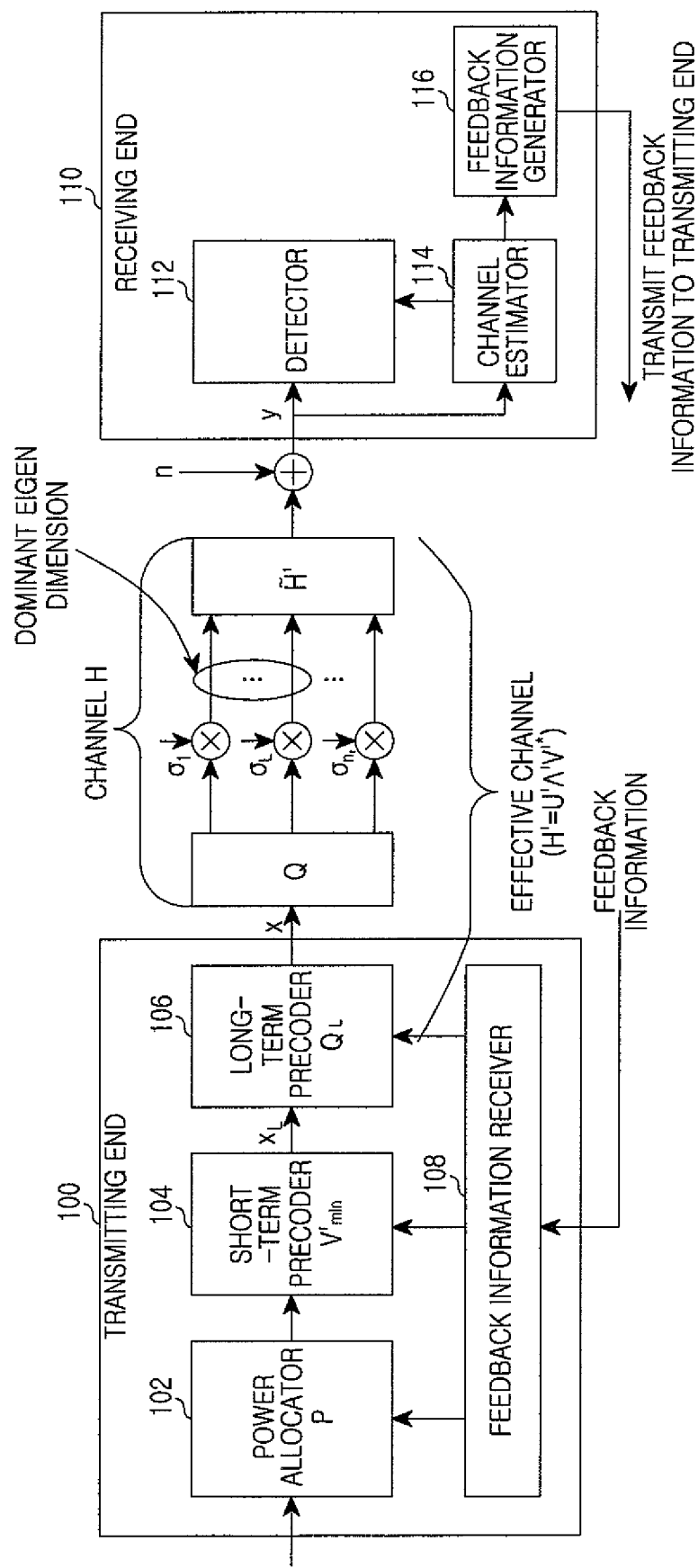
FIG. 1 illustrates a structure of a Multiple-Input Multiple-Output (MIMO) system according to an exemplary embodiment of the present invention.

FIG. 1 illustrates a structure of a MIMO system according to an exemplary embodiment of the present invention.

Referring to FIG. 1, the MIMO system includes a transmitting end 100 and a receiving end 110. The transmitting end 100 includes a power allocator 102, a short-term precoder 104, a long-term precoder 106, and a feedback information receiver 108. The receiving end 110 includes a detector 112, a channel estimator 114, and a feedback information generator 116.

An exemplary structure of the transmitting end 100 will now be described with reference to FIG. 1. The power allocator 102 allocates power to data streams by using power allocation information and outputs the respective data streams allocated with the power to the short-term precoder 104.

The short-term precoder 104 multiplies the respective data streams allocated with the power by a short-term precoding matrix to perform short-term precoding, and outputs the short-term precoded data streams to the long-term precoder 106.

The long-term precoder 106 multiples the respective data streams by a long-term precoding matrix to perform long-term precoding, and transmits the long-term precoded data streams to the receiving end 110. The long-term precoding matrix is a matrix for selecting a preset number of dominant eigen dimensions of the correlation matrix, that is, a matrix for selecting dominant virtual antennas for transmitting the Tx data. The long-term precoding matrix is added to reduce a feedback overhead of the short-term precoding matrix and power allocation information. The long-term precoding matrix is updated by the receiving end 110 only when necessary. Thus, the feedback overhead produced when the long-term precoding matrix is added is smaller than those of a short-term precoding matrix and power allocation information.

The feedback information receiver 108 receives a feedback of the short-term precoding matrix, the power allocation information, and the long-term precoding matrix from the receiving end 110, and outputs the received matrix or information to the power allocator 102, the short-term precoder 104 or the long-term precoder 106 to update the respective matrix and information. The short-term precoding matrix and the power allocation information are much more frequently received than the long-term precoding matrix.

A structure of the receiving end 110 will now be described. The detector 112 decodes Receive (Rx) data input through an antenna according to a preset MIMO detection scheme, estimates Tx data transmitted from the transmitting end 110, and outputs the Tx data. Examples of the MIMO detection scheme include a Maximum Likelihood (ML) scheme, a Modified ML (MML) scheme, a Zero Forcing (ZF) scheme, a Minimum Mean Square Error (MMSE) scheme, a Successive Interference Cancellation (SIC) scheme, and a Vertical Bell Labs LAyered Space-Time (V-BLAST) scheme. A demodulator/decoder (not shown) demodulates and decodes data received from the detector 112 and thus restores original information data.

The channel estimator 114 estimates a channel by using a specific signal (e.g., a pilot signal) of the Rx data input through the antenna and thus forms a channel matrix H. Then the channel estimator 114 outputs the channel matrix to the detector 112 and the feedback information generator 116. The detector 112 estimates Tx data by using the channel matrix. The feedback information generator 116 generates the long-term precoding matrix, the short-term precoding matrix, and the power allocation information by using the channel matrix.

The feedback information generator 116 estimates a correlation matrix between Tx antennas and an average Signal to Noise Ratio (SNR) by using the channel matrix provided from the channel estimator 114, and then generates and quantizes the long-term precoding matrix by using the estimated matrix and information. Thereafter, the feedback information generator 116 generates a message, which requests modification of the long-term precoding matrix and includes the quantized long-term precoding matrix, according to whether the long-term precoding matrix needs to be modified, and feeds back the message to the transmitting end 100. Further, the feedback information generator 116 generates and quantizes the short-term precoding matrix and the power allocation information by using the channel matrix provided from the channel estimator 114, and thereafter feeds back the quantized short-term precoding matrix and power allocation information to the transmitting end 100. In this case, the short-term precoding matrix and the power allocation information are much more frequently generated than the long-term precoding matrix.

The preset number of dominant eigen dimensions are represented by columns of Q. Thus, the preset number (e.g., L) of dominant virtual antennas may be selected when the transmitting end multiplies a Tx data stream by a long-term precoding matrix $Q_L$, where $Q_L=[q_1 \ldots q_L]$. By using $H':=HQ_L$, an Rx signal can be expressed by Equation (10) below.

$$y=H'x_L+n \tag{10}$$

In Equation (10), $X_L$ denotes Tx data which is short-term precoded by the short-term precoder 104. Since the system has L virtual antennas (where $L \leq n_t$), an exemplary adaptive transmission method of the present invention is achieved by using a channel matrix H' whose dimension is smaller than that of the channel matrix H. Therefore, an amount of feedback information can be reduced.

The channel H' having a decreased dimension of $(n_r \times L)$ (where $H'=HQ_L$) can be expressed by Equation (11) below by using Equation (4) above, that is, $H=\tilde{H}R_t^{1/2}$.

$$H'=\tilde{H}R_t^{1/2}Q_L=\tilde{H}Q\Sigma Q^*Q_L=\tilde{H}'\Sigma_L \tag{11}$$

In Equation (11), $\tilde{H}'$ (where $\tilde{H}':=\tilde{H}Q$) is a random matrix having the same distribution as $\tilde{H}$, and $\Sigma_L$ denotes an $(n_t \times L)$-dimensional matrix in which diagonal elements are the same as first L diagonal elements of $\Sigma$ and the remaining elements are 0. Each diagonal element of $\Sigma$ represents an average channel gain which is delivered to the receiving end through each virtual antenna. Therefore, when a sum of eigen values of unselected eigen dimensions is significantly small, most channel energy can be delivered to the receiving end through the L virtual Tx antennas according to an exemplary embodiment of the present invention.

The dimension-reduced MIMO channel can be SVD-decomposed as expressed by Equation (12) below.

$$H' = U\Lambda'V'^* \quad (12)$$

In Equation (12), U' and V' respectively denote an $(n_r \times n_r)$-dimensional unitary matrix and an $(L \times L)$-dimensional unitary matrix, and $\Lambda'$ denotes an $(n_r \times L)$-dimensional diagonal matrix in which diagonal elements $\lambda_1' \geq \ldots \geq \lambda_{n'_{min}}'$ are greater than 0 and the remaining elements are 0 (where $n'_{min} = \min(L, n_r)$).

Meanwhile, the system capacity for $\tilde{H}'$ can be maximized by optimizing a covariance matrix $K_{x_L}$, where $K_{x_L} := E\{x_L x^*_L\}$. The covariance matrix can be optimized by using an $(L \times n'_{min})$-dimensional precoding matrix $V'_{min}$ composed of first $n'_{min}$ columns of V' and by using Tx power $\{P'_i, i=1, \ldots, n'_{min}\}$ corresponding to $V'_{min}$. In this case, the amount of feedback information of the precoding matrix and Tx power are respectively reduced by $$\frac{(L \times n'_{min})}{(n_t \times n_{min})} \text{ and } \frac{n'_{min}}{n_{min}}.$$

A capacity of the proposed system can be expressed by Equation (13) below.

$$C_{partial} = \log_2 \det(I + H' K_{x_L} H'^*) = \sum_{i=1}^{n'_{min}} \log_2(1 + \lambda_i'^2 P_i') \quad (13)$$

In Equation (13), $\lambda'_i$ denotes an $i^{th}$ singular value of the channel matrix H', and $P'_i$ denotes Tx power allocated to an $i^{th}$ spatial channel.

Figure 2:
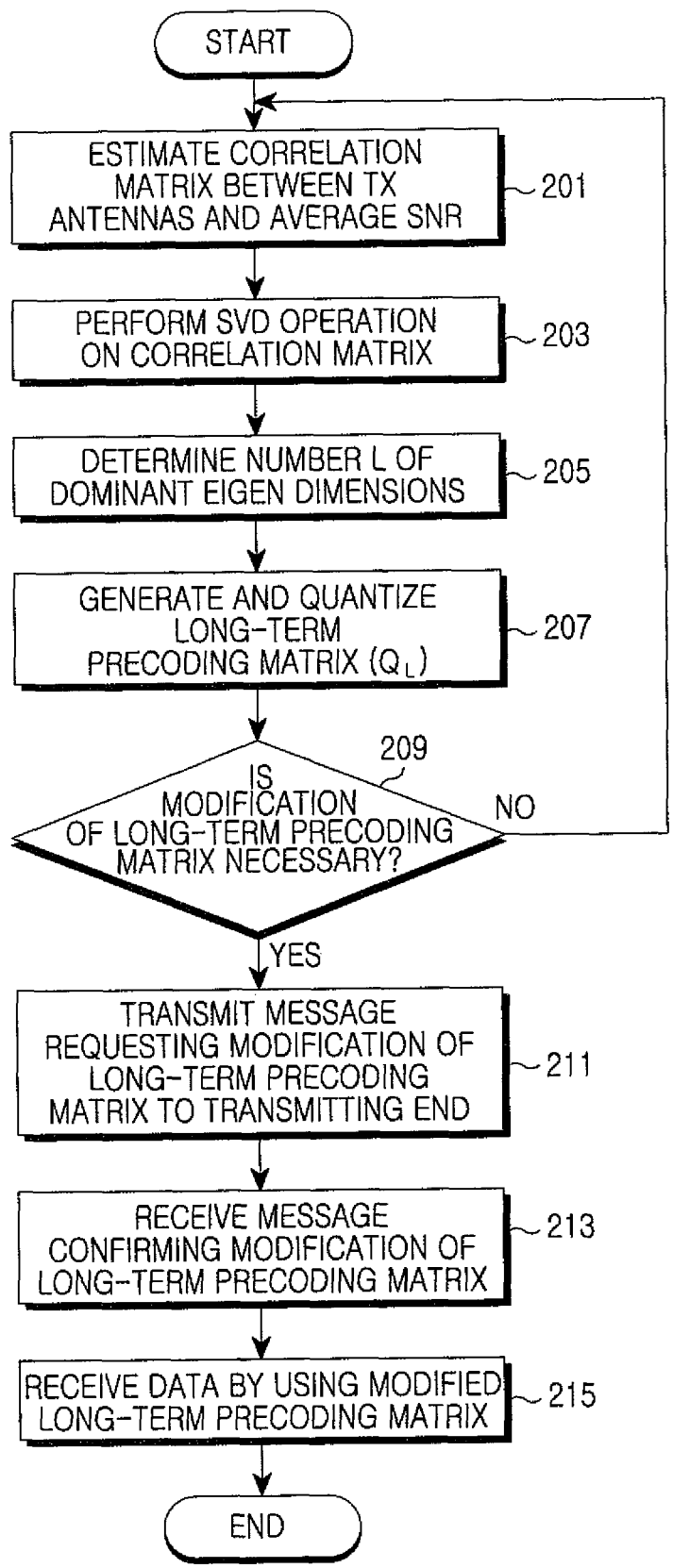
FIG. 2 is a flowchart illustrating a feedback process of a long-term precoding matrix, performed by a receiving end, in a MIMO system according to an exemplary embodiment of the present invention.

FIG. 2 is a flowchart illustrating a feedback process of a long-term precoding matrix, performed by a receiving end, in a MIMO system according to an exemplary embodiment of the present invention.

Referring to FIG. 2, the receiving end estimates a correlation matrix $R_t$ between Tx antennas and an average SNR by using a pilot signal transmitted through each antenna of a transmitting end in step 201.

In step 203, the receiving end performs an SVD operation on the correlation matrix between the Tx antennas by using Equation (3) above. In step 205, the receiving end determines a value L indicating the number of dominant eigen dimensions by using $\Sigma$ obtained by performing the SVD operation and the estimated average SNR. Herein, $\Sigma$ is an $(n_t \times n_t)$-dimensional diagonal matrix having diagonal elements of $\sigma_1 \geq \ldots \geq \sigma_{n_t}$.

The value L can be determined as expressed by Equation (14) below.

$$L = \begin{cases} \max\left\{\min\left\{L \mid \sum_{i=L+1}^{n_t} \sigma_i^2 \leq \delta_{th}\right\}, n_{min}\right\}, & \text{if } SNR > SNR_{Th} \\ \min\left\{L \mid \sum_{i=L+1}^{n_t} \sigma_i^2 \leq \delta_{th}\right\}, & \text{if } SNR \leq SNR_{Th} \end{cases} \quad (14)$$

In Equation (14), $SNR_{Th}$ denotes a value determined by the system according to an operational environment, and $\delta_{th}$ denotes a threshold selected by considering both feedback information amount and performance degradation. As expressed by Equation (14) above, the value of L is selected in such a manner that, when in a low SNR environment, the smallest value is selected from values in which a sum of the remaining dominant eigen dimensions other than the L dominant eigen dimensions is less than or equal to the threshold $\delta_{th}$, and when in a high SNR environment, a greater value between the selected value of L and $n_{min}$ is selected through comparison to determine a final value of L. The reason that the greater value is selected as the final value of L by comparison with $n_{min}$ will be described in greater detail below when the capacity loss is analyzed by using Equation (16).

In step 207, the receiving end extracts first L column vectors from a Q matrix obtained by performing the SVD operation to generate a long-term precoding matrix $Q_L$, and then quantizes the long-term precoding matrix.

In step 209, the receiving end determines whether the transmitting end needs to modify the long-term precoding matrix. For example, if the quantized long-term precoding matrix is different from a previous long-term precoding matrix, the receiving end may determine that the transmitting end needs to modify the long-term precoding matrix. If it is determined that the transmitting end does not need to modify the long-term precoding matrix, the receiving end ignores the long-term precoding matrix, and proceeding to step 201, repeats the subsequent steps.

Otherwise, if it is determined that the transmitting end needs to modify the long-term precoding matrix, proceeding to step 211, the receiving end generates a message requesting modification of the long-term precoding matrix and including the quantized long-term precoding matrix and transmits the message to the transmitting end. In this case, the transmitting end updates its long-term precoding matrix to the long-term precoding matrix received from the receiving end, generates a message confirming the modification of the long-term precoding matrix, and transmits the message to the receiving end. Thereafter, the receiving end receives the message which confirms the modification of the long-term precoding in step 213, and receives data from the transmitting end by using the modified long-term precoding matrix in step 215.

Thereafter, the procedure of FIG. 2 ends.

Figure 3:
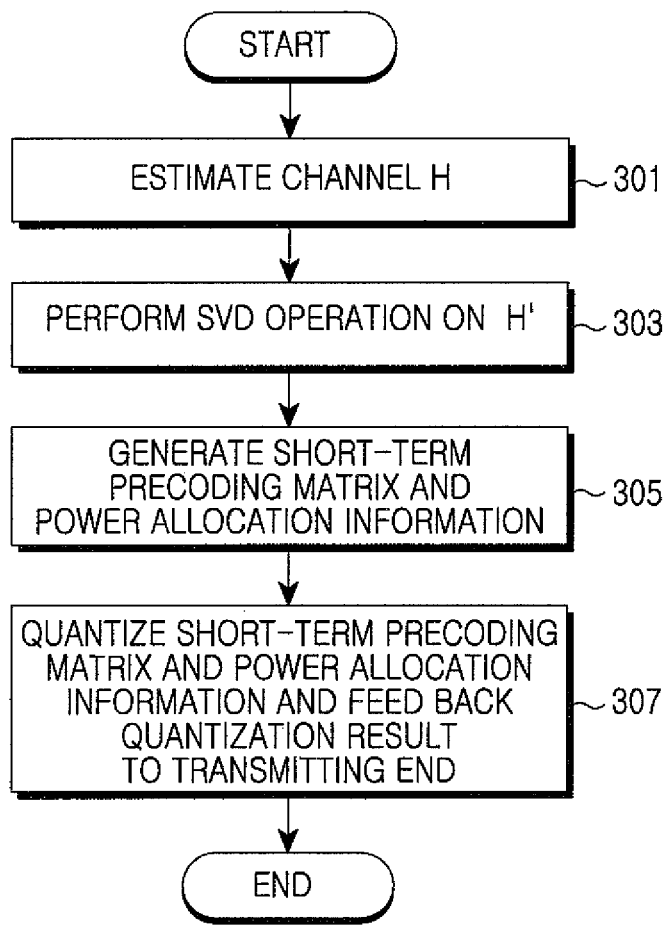
FIG. 3 is a flowchart illustrating a feedback process of a short-term precoding matrix, performed by a receiving end, in a MIMO system according to an exemplary embodiment of the present invention.

FIG. 3 is a flowchart illustrating a feedback process of a short-term precoding matrix, performed by a receiving end, in a MIMO system according to an exemplary embodiment of the present invention.

Referring to FIG. 3, the receiving end estimates a channel H by using a pilot signal transmitted through each antenna of a transmitting end in step 301. In step 303, a channel response matrix $H' = HQ_L$ multiplied by a long-term precoding matrix is SVD-decomposed as expressed by Equation (12) above, that is, $H' = HQ_L = U'\Lambda'V'^*$.

In step 305, the receiving end extracts first $n'_{min}$ column vectors (where $n'_{min} = \min(L, n_r)$) from V' obtained by performing the SVD operation, and thus generates a short-term precoding matrix. In step 305, the receiving end also generates power allocation information by using a water filling scheme with respect to diagonal elements of a diagonal matrix $\Lambda'$ obtained by performing the SVD operation.

In step 307, the receiving end quantizes the generated short-term precoding matrix and power allocation information and feeds back the quantization result to the transmitting end. Thereafter, the procedure of FIG. 3 ends.

The feedback process of the long-term precoding matrix of FIG. 2 is carried out on the basis of a correlation between antennas and an average channel value (e.g., an average SNR), whereas the feedback process of the short-term precoding matrix of FIG. 3 is carried out on the basis of an instantaneous channel value. Therefore, the feedback process of the short-term precoding matrix and power allocation information is more frequently performed than the feedback process of the long-term precoding matrix. For example, the feedback process of the short-term precoding matrix and power allocation information may be performed in a unit of millisecond (ms), whereas the feedback process of the long-term precoding matrix may be performed in a unit of several seconds.

Figure 4:
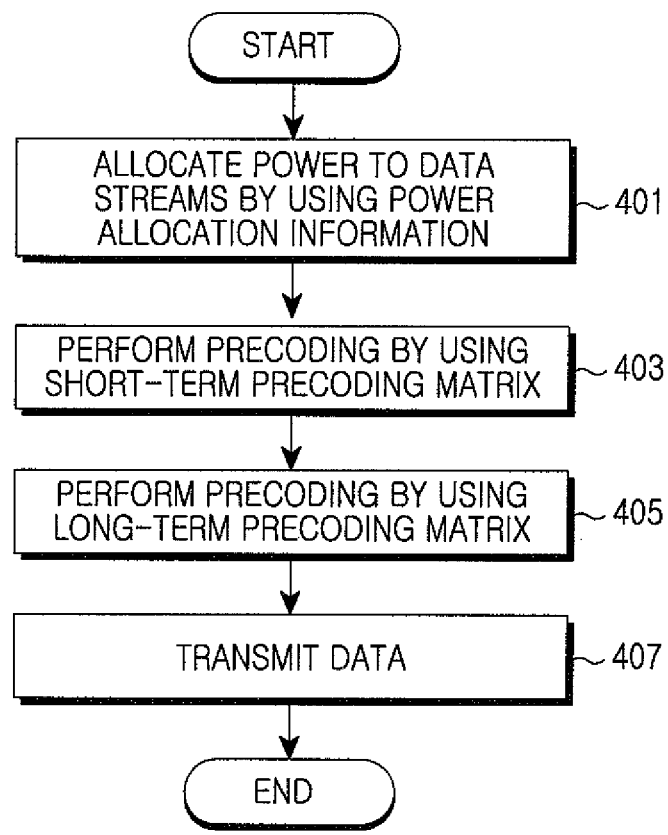
FIG. 4 is a flowchart illustrating a data transmission process performed by a transmitting end in a MIMO system according to an exemplary embodiment of the present invention.

FIG. 4 is a flowchart illustrating a data transmission process performed by a transmitting end in a MIMO system according to an exemplary embodiment of the present invention. Herein, the transmitting end receives feedback including a short-term precoding matrix, power allocation information, and a long-term precoding matrix from a receiving end, and performs updates using the received data. The short-term precoding matrix and the power allocation information are more frequently updated than the long-term precoding matrix.

Referring to FIG. 4, the transmitting end allocates power to data streams by using the power allocation information in step 401. In step 403, the transmitting end performs short-term precoding by multiplying the respective data streams by the short-term precoding matrix. In step 405, the transmitting end performs long-term precoding by multiplying the respective short-term precoded data streams by a long-term precoding matrix. In step 407, the transmitting end transmits the long-term precoded data to the receiving end.

Thereafter, the procedure of FIG. 4 ends.

Now, a result obtained by analyzing a capacity loss of a system using an exemplary partial adaptive transmission method of the present invention will be described in comparison with a system using a conventional full adaptive transmission method.

Herein, the capacity loss can be defined as expressed by Equation (15) below.

$$\Delta := C_{full} - C_{partial} = \sum_{i=1}^{n_{min}} \log_2(1 + \lambda_i^2 P_i) - \sum_{i=1}^{n'_{min}} \log_2(1 + \lambda_i'^2 P_i') \quad (15)$$

In a high SNR environment, optimal Tx power is obtained by allocating an equal amount of power to each spatial channel. In this case, the capacity loss can be approximated using Equation (16) below.

$$\Delta \approx \sum_{i=1}^{n_{min}} \log_2\left(\lambda_i^2 \frac{P}{n_{min}}\right) - \sum_{i=1}^{n'_{min}} \log_2\left(\lambda_i'^2 \frac{P}{n'_{min}}\right)$$

$$= \begin{cases} \infty, & \text{if } L < n_{min} \\ \sum_{i=1}^{n_{min}} \log_2\left(\frac{\lambda_i^2}{\lambda_i'^2}\right), & \text{otherwise} \end{cases} \quad (16)$$

In Equation (16), in case of $L < n_{min}$, the capacity loss increases to infinity due to a decrease in a spatial multiplexing gain. Thus, a value L indicating the number of virtual antennas should be selected to satisfy $L \geq n_{min}$, that is, $n'_{min} = n_{min}$. In this case, $\lambda_i^2 = \lambda_i'^2 + \epsilon_i (\epsilon_i \geq 0)$, the capacity loss can be expressed by Equation (17) below.

$$\Delta \approx \sum_{i=1}^{n_{min}} \log_2\left(1 + \frac{\epsilon_i}{\lambda_i'^2}\right) \leq n_{min} \log_2\left(1 + \frac{1}{n_{min}\lambda_{min}'^2} \sum_{i=1}^{n_{min}} \epsilon_i\right) \quad (17)$$

In Equation (17), $\lambda'_{min}$ denotes a minimum singular value of H'. A sum of eigen values of a matrix can be represented by a trace as expressed by Equation (18) below.

$$\sum_{i=1}^{n_{min}} \epsilon_i = tr[HH^*] - tr[H'H'^*] = \sum_{i=L+1}^{n_t} \|\tilde{h}_i'\|^2 \sigma_i^2 \quad (18)$$

In Equation (18), tr[ ] and $\|\ \|$ respectively denote a trace and a Frobenius norm of each matrix, and $\tilde{h}'_i$ denotes an $i^{th}$ column of $\tilde{H}'$. By using Equation (18), Equation (17) above can be expressed by Equation (19) below.

$$\Delta \leq n_{min} \log_2\left(1 + \frac{1}{n_{min}\lambda_{min}'^2}\left(\sum_{i=L+1}^{n_t} \|\tilde{h}_i'\|^2 \sigma_i^2\right)\right) \quad (19)$$

By using a Jensen's inequality, an average capacity loss can be upper bounded as expressed by Equation (20) below.

$$E\{\Delta\} \leq n_{min} \log_2\left(1 + \frac{n_r}{n_{min}} E\left\{\frac{1}{\lambda_{min}'^2}\right\}\left(\sum_{i=L+1}^{n_t} \sigma_i^2\right)\right) \quad (20)$$

The optimal Tx power at a lower SNR environment is obtained when all of the power is allocated to a spatial channel having a largest channel gain (i.e., $P_1 = P'_1 = P$). In this case, similar to the case of Equation (20) above, an average capacity loss can be upper-bounded by Equation (21) below.

$$E\{\Delta\} \leq n_r \left(\sum_{i=L+1}^{n_t} \sigma_i^2\right) P \log_2 e \quad (21)$$

According to the results obtained by analyzing Equation (20) and Equation (21) above, it can be seen that the capacity loss can be minimized by properly selecting dominant virtual antennas.

Meanwhile, to reduce feedback information overhead and also to maximize performance improvement, it may be desirable to artificially introduce a correlation between Tx antennas. For example, if a downlink cellular system capable of obtaining a spatial multiplexing gain of M (where $M \leq n_t$) is used, it is desirable that a user in a high SNR environment at a center of a cell has to use at least M dominant virtual antennas (where $M \leq n_t$) in order to maximize the spatial multiplexing gain, and a user in a low SNR environment, such as in a cell boundary environment, has to use a smallest possible number of virtual antennas in order to reduce the feedback information overhead so that the most channel gain can be delivered to the receiving end. Since a correlation between antennas is highly related to a distance between the antennas, it is desirable that Tx antennas are divided into M groups (where $M \leq n_t$), a distance between antennas belonging to each group is reduced (e.g., by a half wavelength distance), and a distance between consecutive groups is as large as possible. In this case, the system uses the M dominant virtual antennas (where M≦$n_t$), and, according to an exemplary scheme, a maximum spatial multiplexing gain can be obtained and the feedback information overhead can be reduced by M/$n_t$.

Figure 5:
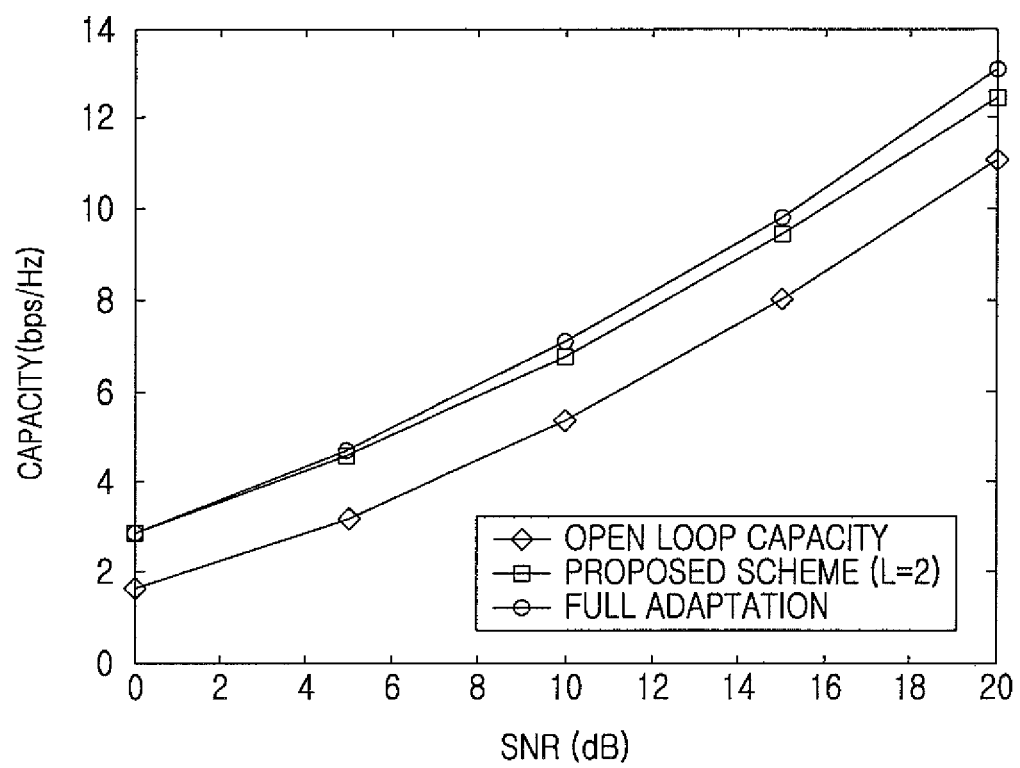
FIG. 5 is a graph illustrating a result obtained by comparing an adaptive MIMO transmission method according to an exemplary embodiment of the present invention with a conventional method.

FIG. 5 is a graph illustrating a result obtained by comparing an exemplary adaptive MIMO transmission method of the present invention with a conventional method. The graph is obtained by performing simulation in a Rayleigh channel environment which has four Tx antennas and two Rx antennas. The comparison between the conventional scheme and the proposed scheme is made in terms of performance in a condition that the four Tx antennas are arranged apart from one another by four times a wavelength.

Referring to FIG. 5, an exemplary scheme (L=2) shows performance in which a feedback information amount required to feed back precoding information is reduced by about half while a capacity is almost the same as that of the conventional full adaptation scheme. In addition, the exemplary scheme shows much higher performance than when using an open loop system in which a transmitting end does not use channel information.

According to exemplary embodiments of the present invention, in a MIMO system having a spatial correlation between channels, data is transmitted by using a preset number of dominant eigen dimensions (i.e., virtual antennas) of a correlation matrix. Therefore, an amount of feedback information can be reduced since a channel matrix H has a small dimension, and it is possible to provide almost the same performance as that of the conventional full adaptation scheme. That is, most MIMO channel gain can be obtained by considering only the dominant eigen dimension of the correlation matrix. In addition, performance of an exemplary scheme can be further improved when the correlation is artificially introduced by controlling a distance between antennas.

While the present invention has been shown and described with reference to certain exemplary embodiments thereof, it will be understood by those skilled in the art that various changes in form and details may be made herein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A feedback transmission method of a receiving end in a Multiple-Input Multiple-Output (MIMO) system, the method comprising:
estimating a correlation matrix between Transmit (Tx) antennas and an average Signal to Noise Ratio (SNR); and
generating a long-term precoding matrix composed of a preset number of dominant eigen dimensions of the correlation matrix using the estimated correlation matrix and the estimated average SNR,
wherein the dominant eigen dimensions comprise a number of virtual antennas smaller than all spatial channels in the MIMO system comprising a spatial correlation between the channels, and
wherein the preset number is determined according to a selected one of a plurality of equations, the selected one equation being selected on a basis of the estimated average SNR.

2. The method of claim 1, further comprising:
quantizing the generated long-term precoding matrix;
determining whether the long-term precoding matrix needs to be modified; and
if it is determined that the long-term precoding matrix needs to be modified, transmitting a message requesting modification of the long-term precoding matrix and including the quantized long-term precoding matrix, to a transmitting end.

3. The method of claim 2, wherein the determining of whether the long-term precoding matrix needs to be modified comprises determining according to whether the quantized long-term precoding matrix is different from a previous long-term precoding matrix.

4. The method of claim 2, further comprising:
receiving a message confirming the modification of the long-term precoding matrix from the transmitting end; and
receiving data from the transmitting end using the modified long-term precoding matrix.

5. The method of claim 1, wherein the generating of the long-term precoding matrix comprises:
obtaining a diagonal matrix and a unitary matrix by performing a Singular Value Decomposition (SVD) operation on the estimated correlation matrix between the Tx antennas;
determining a value indicating the number of dominant eigen dimensions by using the obtained diagonal matrix and the estimated average SNR; and
forming the long-term precoding matrix by extracting column vectors, starting from a first column to an $n^{th}$ column, wherein n is equal to the determined value, from the obtained unitary matrix.

6. The method of claim 5, wherein the value indicating the number of dominant eigen dimensions is determined using Equation:

$$L = \begin{cases} \max\left\{\min\left\{L \middle| \sum_{i=L+1}^{n_t} \sigma_i^2 \leq \delta_{th}\right\}, n_{\min}\right\}, & \text{if } SNR > SNR_{Th} \\ \min\left\{L \middle| \sum_{i=L+1}^{n_t} \sigma_i^2 \leq \delta_{th}\right\}, & \text{if } SNR \leq SNR_{Th} \end{cases},$$

where $\sigma_i$ denotes a diagonal element of the diagonal matrix, $n_t$ denotes the number of Tx antennas of the transmitting end, $SNR_{Th}$ denotes an SNR value determined by the system according to an operational environment, $\delta_{th}$ denotes a threshold selected by considering both a feedback information amount and performance degradation, and $n_{min}$ denotes a smaller value between the number of Tx antennas of the transmitting end and the number of Receive (Rx) antennas of the receiving end.

7. A feedback transmission apparatus of a receiving end in a Multiple-Input Multiple-Output (MIMO) system, the apparatus comprising:
a channel estimator for estimating a channel and for forming a channel matrix using information on the estimated channel; and
a feedback information generator for estimating a correlation matrix between Transmit (Tx) antennas and an average Signal to average Noise Ratio (SNR) by using the channel matrix and for generating a long-term precoding matrix composed of a preset number of dominant eigen dimensions of the correlation matrix using the estimated correlation matrix and average SNR, wherein the dominant eigen dimensions comprise a number of virtual antennas smaller than all spatial channels in the MIMO system comprising a spatial correlation between the channels, and wherein the preset number is determined according to a selected one of a plurality of equations, the selected one equation being selected on a basis of the estimated average SNR.

8. The apparatus of claim 7, wherein the feedback information generator quantizes the generated long-term precoding matrix, determines whether the long-term precoding matrix needs to be modified, and transmits a message requesting modification of the long-term precoding matrix and including the quantized long-term precoding matrix, to a transmitting end.

9. The apparatus of claim 8, wherein the necessity of modification of the long-term precoding matrix is determined according to whether the quantized long-term precoding matrix is different from a previous long-term precoding matrix.

10. The apparatus of claim 7, wherein the feedback information generator comprises:

means for obtaining a diagonal matrix and a unitary matrix by performing a Singular Value Decomposition (SVD) operation on the estimated correlation matrix between the Tx antennas;

means for determining a value for indicating the number of dominant eigen dimensions by using the obtained diagonal matrix and the estimated average SNR; and means for forming the long-term precoding matrix by extracting column vectors, starting from a first column to an $n^{th}$ column, wherein n is equal to the determined value, from the obtained unitary matrix.

11. The apparatus of claim 10, wherein the value indicating the number of dominant eigen dimensions is determined using Equation:

$$L = \begin{cases} \max\left\{\min\left\{L \mid \sum_{i=L+1}^{n_t} \sigma_i^2 \leq \delta_{th}\right\}, n_{\min}\right\}, \text{ if } SNR > SNR_{Th} \\ \min\left\{L \mid \sum_{i=L+1}^{n_t} \sigma_i^2 \leq \delta_{th}\right\}, \text{ if } SNR \leq SNR_{Th} \end{cases}$$

where $\sigma_i$ denotes a diagonal element of the diagonal matrix, $n_t$ denotes the number of Tx antennas of the transmitting end, $SNR_{Th}$ denotes an SNR value determined by the system according to an operational environment, $\delta_{th}$ denotes a threshold selected by considering both a feedback information amount and performance degradation, and $n_{min}$ denotes a smaller value between the number of Tx antennas of the transmitting end and the number of Receive (Rx) antennas of the receiving end.

\* \* \* \* \*